(12) United States Patent
Hao et al.

(10) Patent No.: US 9,681,328 B2
(45) Date of Patent: Jun. 13, 2017

(54) MULTIPLE MODEM DEVICE INCLUDING NOTIFICATION MODEM

(71) Applicant: Verizon Patent and Licensing Inc., Arlington, VA (US)

(72) Inventors: Jianxiu Hao, Acton, MA (US); Michael P. Ruffini, Methuen, MA (US); Zhong Chen, Acton, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 63 days.

(21) Appl. No.: 14/753,646

(22) Filed: Jun. 29, 2015

(65) Prior Publication Data

US 2016/0381593 A1 Dec. 29, 2016

(51) Int. Cl.
*H04W 28/02* (2009.01)
*H04L 29/08* (2006.01)
*H04W 4/00* (2009.01)
*H04W 52/02* (2009.01)

(52) U.S. Cl.
CPC ....... *H04W 28/0215* (2013.01); *H04L 67/125* (2013.01); *H04W 4/005* (2013.01); *H04W 28/0221* (2013.01); *H04W 52/0212* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 9,351,193 | B2* | 5/2016 | Raleigh | H04M 15/80 |
| 2010/0017506 | A1* | 1/2010 | Fadell | H04M 15/00 |
| | | | | 709/224 |
| 2014/0241322 | A1* | 8/2014 | Kim | H04W 36/023 |
| | | | | 370/331 |
| 2014/0286316 | A1* | 9/2014 | Park | H04W 36/22 |
| | | | | 370/332 |
| 2015/0110077 | A1* | 4/2015 | Lee | H04W 48/20 |
| | | | | 370/332 |

* cited by examiner

*Primary Examiner* — Eunsook Choi

(57) ABSTRACT

A method, in a multiple modem device that includes a notification modem and a Wi-Fi modem, includes identifying data to be collected and rules for selecting an optimal modem for data transmission from the multiple modem device. The method also includes collecting the data, and determining whether the data is to be sent via the notification modem based on a payload size associated with the data and the rules. The method includes sending the data via a control channel of a cellular network associated with the notification modem in response to a determination that the data to be sent via the notification modem. A determination whether a Wi-Fi network is available is made in response to a determination that the data is not to be sent via the notification modem. The data is sent via the Wi-Fi modem over the Wi-Fi network.

20 Claims, 8 Drawing Sheets

MULTIPLE MODEM DEVICE INCLUDING NOTIFICATION MODEM

BACKGROUND INFORMATION

The Internet of Things (IoT) is a network of devices, associated with physical objects or "things". IoT devices may include capabilities for exchanging data with other devices in the network and, in some instances, may be integrated into the physical objects that they monitor or are associated with, such as vending machines, door locks, security cameras, etc. The other devices in the network may include user devices or machine to machine (M2M) devices. The user devices may be associated with manufacturers and device operators while the M2M devices may receive monitoring data and provide instructions to the IoT devices. IoT devices may include electronics, software, sensors and connectivity that enable the IoT devices to collect and exchange data regarding the associated physical objects with the other devices that connect to the IoT. IoT devices may be uniquely identifiable and may communicate using M2M communication.

M2M communication allows (wireless and/or wired) systems to communicate with other devices without manual human interaction. M2M communication may include a wide range of applications for interaction between devices, such as monitoring and control for industrial automation, logistics, Smart Grid, Smart Cities, health, defense, etc. The data transferred during M2M communications may include different types and sizes that may be associated with different applications. For example, M2M communications may include short message, multimedia, etc.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for selecting an optimal modem for data transmission from a multiple modem device that includes a notification modem. The multiple modem device may be an Internet of Things (IoT) device and may include a rule engine. The multiple modems may include a Wi-Fi modem and a wireless data modem (e.g., third generation (3G), fourth generation (4G) or fifth generation (5G) standard Internet protocol (IP) data connection).

The notification modem may output notifications from the multiple modem device to a cloud platform (i.e., various servers that support the device) or receive notifications from the cloud platform. The notification modem may connect to a long term evolution (LTE) wireless network through a control channel (e.g., using short message service (SMS) messages, etc.). The payload of the notification modem may be small by default, for example 256 bytes. The notification modem may also be a low power (consumption) device that includes a small extended life battery (e.g., a thumbnail battery) that may power the notification modem for an extended time (e.g., 2 years' use).

The rule engine may determine optimal data transmission performance based on selection of a modem from among multiple modems that include the notification modem. The rule engine may determine particular actions to take with regard to the multiple modems and data transfers by analyzing the data from the multiple modem device or commands received from applications through the notification modem. The optimal data transmission may be determined based on minimization of resource usage based on particular scenarios associated with each data transmission and, in some instances, time and storage constraints associated with the multiple modem device.

Figure 1:
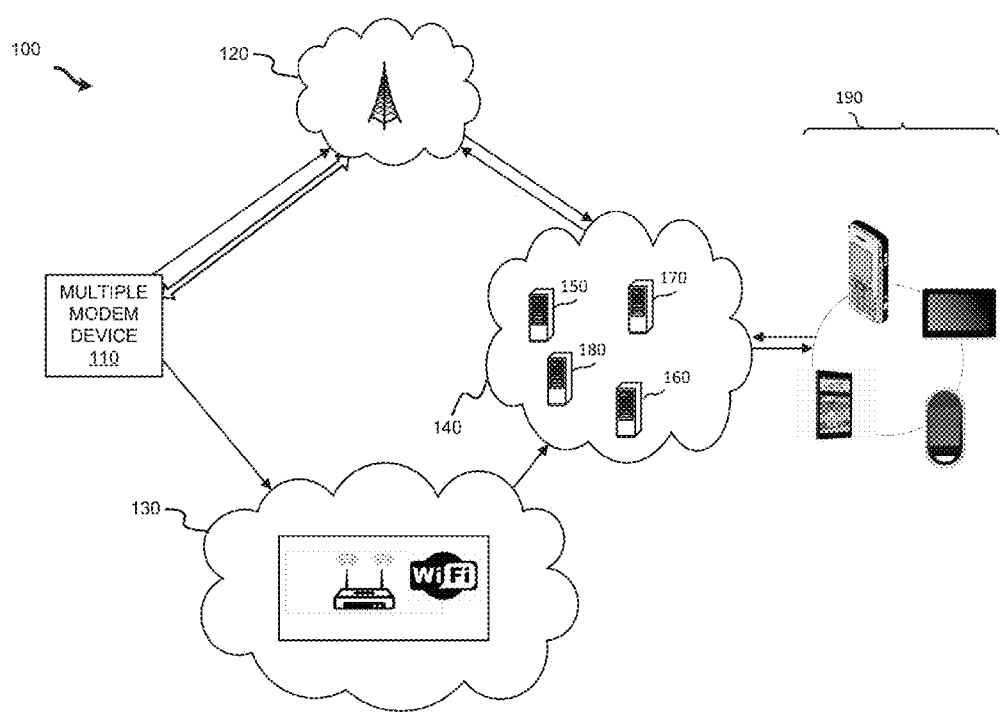
FIG. 1 illustrates an exemplary network in which systems and methods described herein may be implemented.

FIG. 1 is a diagram of an exemplary network 100 in which systems and/or methods described herein may be implemented. As illustrated, network 100 may include a multiple modem device 110, a Wi-Fi network 120, a wireless network 130, a cloud platform 140, and a user device 190. Cloud platform 140 may include an application server 150, a profile server 160, a back end services server 170, and a notification server 180. Components of network 100 may be interconnected via wired and/or wireless connections. The configuration of components of network 100 illustrated in FIG. 1 is for illustrative purposes. Other configurations may be implemented. Therefore, network 100 may include additional, fewer, or different components than those depicted in FIG. 1. Also, in some instances, one or more of the components of network 100 may perform one or more functions described as being performed by another one or more of the components of network 100.

Multiple modem device 110 may include an Internet of Things (IoT) device such as a location tag, a Fitbit™, a connected thermostat, a monitoring camera, a sensor device, or similar device that has Internet connections, such as described herein below with respect to FIG. 3. Multiple modem device 110 may include a notification modem, and additional modems, such as a Wi-Fi modem and a wireless modem (e.g., a 3G or 4G standard IP data connection). Multiple modem device 110 may also include a rule engine that may determine particular actions for the multiple modem device 110 to take by analyzing the data from the multiple modem device 110. Alternatively, multiple modem device 110 may receive commands from a mobile application associated with a user device 190 through cloud platform 140 and the notification modem.

3G/4G (cellular/wireless) network 120 may include a third generation network, or a fourth generation (4G) network (e.g., a long term evolution (LTE) network). 3G/4G network may be based on the Global System for Mobile Communications/Enhanced Data rates for GSM evolution (GSM/EDGE) and Universal Mobile Telecommunications Service/High Speed Packet Access (UMTS/HSPA) network technologies and may operate according to the standard is developed by the 3rd Generation Partnership Project (3GPP).

Wireless network 130 may include one or more wired and/or wireless networks that are capable of receiving, carrying, and transmitting data, voice and/or video signals, including multimedia signals. Wireless network 130 may also include a public switched telephone network (PSTN). Wireless network 130 may include one or more packet switched networks, such as an Internet protocol (IP) based network, a local area network (LAN), a wide area network (WAN), a personal area network (PAN), an intranet, the Internet, or another type of network that is capable of transmitting data. Network 130 may include one or more high-speed data networks, such as a very high performance backbone network services (vBNS) network.

Cloud platform 140 may include components that support the provision of services based on or associated with the multiple modem device 110. For example, cloud platform may include application server 150, profile server 160, back end services server 170, and notification server 180. Cloud platform 140 may provide over the top (OTT) services or additional services to a network via an external network. Cloud platform 140 may enable applications and may perform (or allow analysis at a higher level) as a cloud layer or extension of the IP networks, which perform as an IP layer. For example, IP layer may be analyzed and interacted with based on delivery of data in terms of bits and bytes, while the cloud layer delivers data in terms of objects and contents.

Application server 150 may support interactions between user devices 190, backend servers on cloud platform 140 and multiple modem devices 110 through network 100. Application server 150 may determine formats and interfaces to be provided to user devices 190 based on particular device types. Application server 150 may also aggregate content from different servers per request from user devices 190. Application server 150 may also cache some content locally (relative to particular user devices 190) for performance purposes. Application server 150 may store preference information such as user login, email, partner customer number, etc.

Profile server 160 may store user profile information and perform user account management. User profile information may include user information such as login, email address, physical address, user preference, etc. Profile server 160 may enable access and information sharing with other applications and devices in network 100. Profile server 160 may enable authentication of user device 190 based on information associated with user device 190, such as a mobile number or a passcode.

Back end services server 170 may determine and/or store rules for selecting among the multiple modems included in multiple modem device 110 and enable download of the rules to multiple modem device 110. The multiple modem devices 110 may store the rules as local rules in an associated storage. Back end services server 170 may also conduct analysis and issue commands back to the device through the notification channel, for example as described below with respect to FIG. 7. Back end services server 170 may also perform additional functions such as payment and billing processing, finance and settlement, authentication and provisioning, etc.

Notification server 180 may support notification and commands to the user device 190 via email or messaging. Notification server 180 may receive the commands from the user device 190 and deliver the commands via the control plane in network 120.

User device 190 may include a device that is capable of providing instructions to multiple modem device 110 via cloud platform 140. For example, user device 190 may include a mobile device, such as a tablet, an Internet enabled television (TV), personal computer (PC), video game console (e.g., Xbox, PlayStation 3 (PS3)), or mobile telephone or smartphone (e.g., Android, or iPhone operating system (iOS) handsets), etc. User device 190 may include a client application that enables the user to view and control the multiple modem devices 110.

In implementations described herein, systems and methods may select an optimal modem for data transmission from a multiple modem device that includes a notification modem a Wi-Fi modem, and a cellular modem. Remote commands for the multiple modem device may be received via the notification modem. The systems and methods may support local storage of rules and the rules may be updated over the network through an intelligent cloud server or a command from the application by the user.

Figure 2:
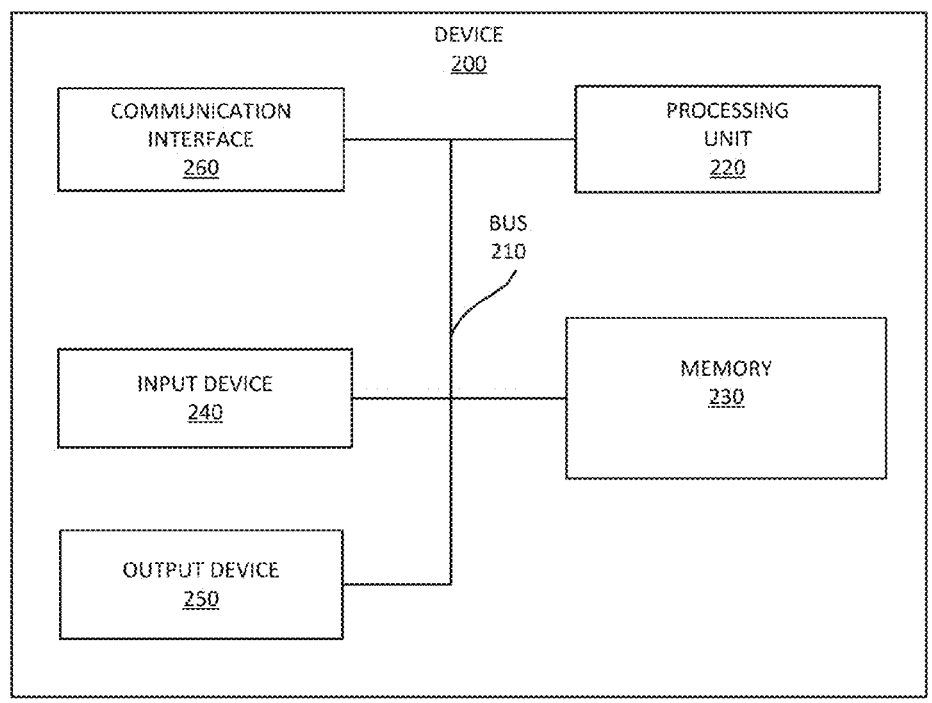
FIG. 2 illustrates an exemplary configuration of one or more of the components of FIG. 1.

FIG. 2 is a diagram of exemplary components of a device 200 that may correspond to one or more devices of network 100, such as multiple modem device 110, application server 150, profile server 160, back end services server 170, notification server 180, and/or user device 190. As illustrated, device 200 may include a bus 210, a processor 220, a main memory 230, a read-only memory (ROM) 240, a storage device 250, an input device 260, an output device 270, and a communication interface 280. Bus 210 may include a path that permits communication among the components of device 200.

Processor 220 may include one or more processors, microprocessors, or other types of processing units that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive.

Input device 260 may include a mechanism that permits an operator to input information to device 200, such as a remote control, control buttons, a keyboard, a mouse, a pen, a microphone, voice recognition and/or biometric mechanisms, a touch screen, etc. Output device 270 may include a mechanism that outputs information to the operator, including a display, an indicator light, a speaker, etc. Communication interface 280 may include any transceiver that enables device 200 to communicate with other devices and/or systems. For example, communication interface 280 may include mechanisms for communicating with another device or system via a network.

As described herein, device 200 may perform certain operations in response to processor 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
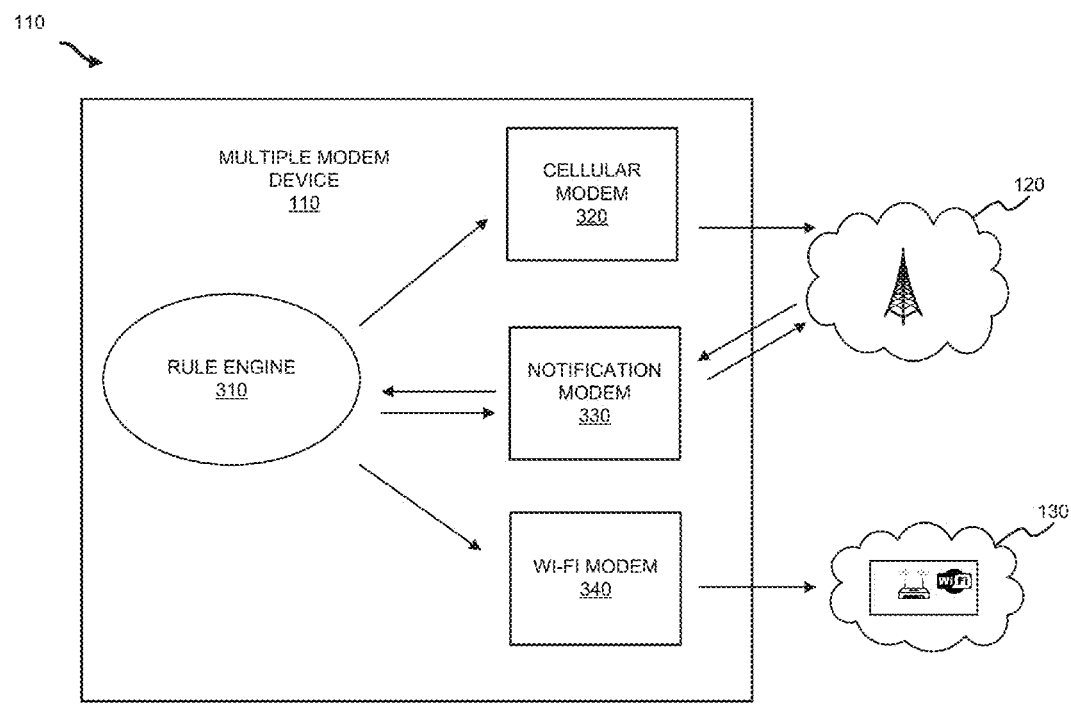
FIG. 3 is a functional block diagram of the multiple modem device of FIG. 1.

FIG. 3 is a diagram of exemplary functional components of multiple modem device 110. In one implementation, the functions described in connection with multiple modem device 110 may be performed by one or more components of device 200 (FIG. 2). As shown in FIG. 3, multiple modem device 110 may include a rule engine 310, a cellular modem 320, a notification modem 330, and a Wi-Fi modem 340.

Multiple modem device 110 may be an IoT device such as a thermostat, location tracker, temperature monitor, meter reader, etc. Multiple modem device 110 may collect information based on a primary function associated with the device (e.g., pictures consumption data, location information, temperature, etc.). Multiple modem device 110 may be configured to work with a mobile application on user device 190 or servers in cloud platform 140, such as application server 150. Multiple modem device 110 may store instructions for operations of the multiple modems and data collected by multiple modem device 110 may be stored in a local data repository.

Rule engine 310 may include instructions for optimal selection of a modem from among the multiple modems to transmit data and receive commands, such as described below with respect to FIG. 4. Rule engine 310 may select a particular modem based on rules and the types, associated applications and/or amounts of data to be transferred. Rule engine 310 may analyze the received data such as location, temperature, or a meter number. Rule engine 310 may store the received data in a local storage, in some instances until the volume of data reaches particular thresholds or predetermined time elapses. Rule engine 310 may instruct the multiple modem device 110 to set up a data connection through Wi-Fi modem 340, cellular modem 330 or send a message through the notification modem 320. Rule engine 310 may connect to cloud platform 140 and may receive updated rules over the network through back end services server 170 or a command from a mobile application on user device 190. Rule engine 310 may control how (e.g., time and modem) data is uploaded to cloud platform 140.

Cellular (or wireless) modem 320 may be a modem that sends and receive data over the cellular wireless network. Cellular modem 320 may connect to 3G/4G network 120 and send data over the bearer plane via a communication gateway (e.g., transmission control protocol (TCP)/IP access gateway (fixed, mobile, etc.)).

Notification modem 330 may send and receive short messages from multiple modem device 110 to cloud platform 140 or mobile applications on user devices 190 via cloud platform 140. Notification modem 320 may be a 4G modem that connects only to the 3G/4G network 120 and may use non-access stratum (NAS) protocol signaling in which the information is transmitted via the control channel only and a bearer plane is not used to carry data. Notification modem 330 may connect to network 120 through LTE control channel via SMS (or similar messaging) using the control channel for communication. The payload (i.e., data package sizes) for each communication may be small and limited to a predetermined threshold (e.g., 256 bytes). Notification modem 330 may be a low power device and may include a thumbnail battery that may power notification modem 330 for an extended time (e.g., 2 years' use).

Wi-Fi modem 340 may send and receive data over a local Wi-Fi network 130. Wi-Fi modem 340 may be remotely configured from cloud platform 140 or by a mobile application on a user device 190 via network 100. Wi-Fi modem 340 may be used to transfer large amounts of data to cloud platform and user device 190 in instances in which the data transfer is not urgent. In instances in which the data transfer is urgent and the user is unable to connect to network 130 (e.g., the user may be traveling with a time threshold associated with the data), the data may be uploaded using a mobile Wi-Fi hot spot.

Figure 4:
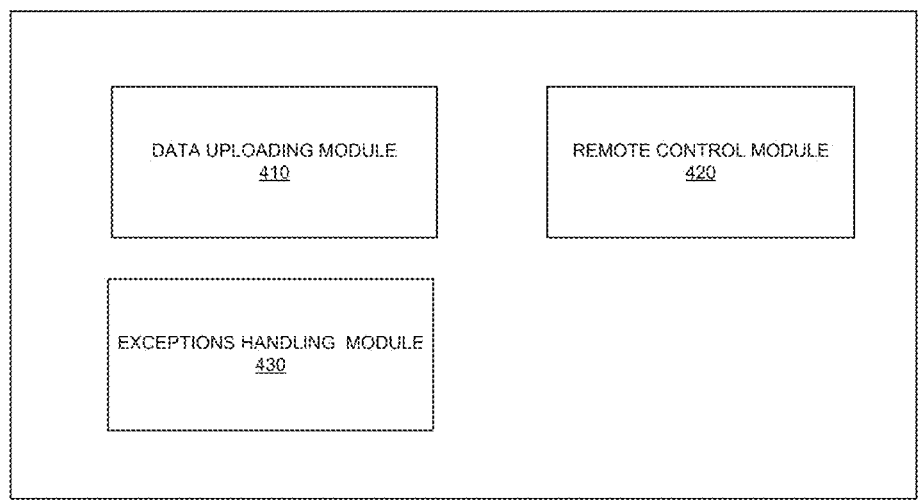
FIG. 4 illustrates a functional block diagram of the rule engine of FIG. 3.

FIG. 4 is a diagram of exemplary functional components of rule engine 310. In one implementation, the functions described in connection with rule engine 310 may be performed by one or more components of device 200 (FIG. 2). As shown in FIG. 4, rule engine 310 may include a data uploading module 410, a remote control module 420, and an exceptions handling module 430.

Rule engine 310 may provide instructions via data uploading module 410, remote control module 420, and/or exceptions handling module 430 to select from among multiple modems (e.g., notification modem 330, wireless modem 320 and Wi-Fi modem 340) to control how data is stored and uploaded from multiple modem device 110 to cloud platform 140.

Data uploading module 410 may receive or access data that is to be uploaded to cloud platform 140. Data uploading module 410 may be restricted to upload data (e.g., video camera or sensor) only in instances in which multiple modem device 110 is connected to Wi-Fi network 130. Data uploading module 410 may collect data and connect to cloud platform 140, such as described herein below with respect to FIG. 5. Data uploading module 410 may parse data types in different data streams to be uploaded and upload the data based on different requirements associated with the transfer of the data (e.g., quality of service (QoS), latency, etc.).

Remote control module 420 may provide (and/or support) a user with the ability to remotely control multiple modem device 110 via a mobile application on a (validated and authorized) user device 190. Remote control module 420 may receive remote control command from the mobile application via the notification modem 330. Remote control module 420 may keep notification modem 330 constantly in an active or receiving mode and may be always ready to receive paging commands from mobile applications (e.g., user device 190), backend services and cloud platform 140. Remote control module 420 may turn off other components associated with Wi-Fi networks 130 or cellular networks 120 when the networks 120/130 (or portions of the network 120) are not being used to conserve power and network bandwidth, as described herein below with respect to FIG. 6.

Exceptions handling module 430 may handle exceptions to the rules for selection of a modem. Exceptions handling module 430 may determine actions for emergency condition based on pre-programmed rules stored in association with rule engine 310. In some particular situations, exceptions may occur in which the rules in the rule engine 310 may not be able to handle the exceptions to selection of the modem. Exceptions handling module 430 may contact back end services server 170 though the notification modem 330 (i.e., the notification modem channel) and receive instructions for responding to the state of emergency, as described herein below with respect to FIG. 7.

Figure 5:
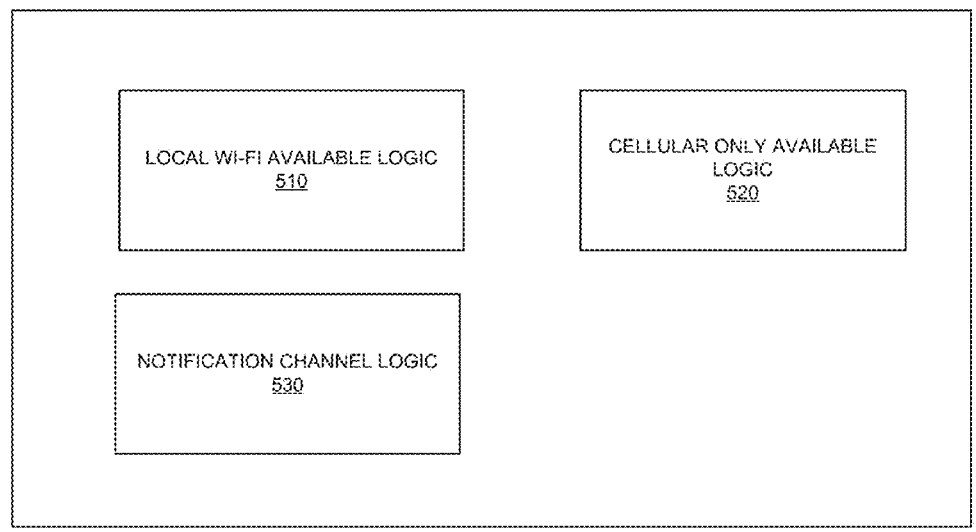
FIG. 5 depicts a functional block diagram of the data uploading module of FIG. 4.

FIG. 5 is an exemplary functional block diagram of data uploading module 410. As shown in FIG. 5, data uploading module 410 may include local Wi-Fi available logic 510, cellular only available logic 520 and notification channel logic 530. Other configurations may be implemented. Therefore, data uploading module 410 may include additional, fewer and/or different components than those depicted in FIG. 5.

Data uploading module 410 may upload data from multiple modem device 110 to back end services server 170 or other storage on cloud platform 140. Data uploading module 410 may include (relatively limited) local storage and collect data. Data uploading module 410 may transfer data to back end services server 170 from time to time based on rules determined by (or stored/downloaded) through rule engine 310

Local Wi-Fi available logic 510 may determine that the data is to be uploaded only in instances in which local Wi-Fi network 130 is available. Local Wi-Fi available logic 510 may save bandwidth by applying a default rule that data collected by the multiple modem device 110 (or particular types of data, associated with particular applications, etc.) is only to be uploaded by the device through a Wi-Fi network 130 and Wi-Fi modem 340. Data may be stored on multiple modem device 110 and transferred to back end services server 170 whenever Wi-Fi connection (via Wi-Fi modem 340) is on. Local Wi-Fi available logic 510 may apply a timer and a volume threshold for the data in order to determine whether to select another modem or network in instances in which a local Wi-Fi network 130 is unavailable.

According to an implementation, local Wi-Fi available logic 510 may determine instances in which there are multiple available local Wi-Fi networks 130. Local Wi-Fi available logic 510 may select a particular local Wi-Fi network 130 or combination of local Wi-Fi networks 130 based on data to be uploaded, processing capacity, security requirements, and other factors associated with multiple modem device 110, the data to be transferred and the particular available local Wi-Fi networks 130. In some instances, local Wi-Fi available logic 510 may send different data streams concurrently over different local Wi-Fi networks 130 (and/or cellular networks 120).

Cellular only available logic 520 may determine instances in which data uploading is to be implemented using the cellular network 120. Cellular only available logic 520 may determine that data is to be uploaded to multiple modem device 110 via cellular network 120 due to unavailable Wi-Fi network 130. Alternatively, cellular only available logic 520 may determine that collected data needs to be transferred to the back end services server 170 and Wi-Fi network 130 is not available. For example, a user may input a command via the mobile application on user device 190. User device 190 may issue a command through the notification modem 330 that data collected on multiple modem device 110 (or, in some instances, a plurality of multiple modem devices 110) is to be transferred immediately to the back end services server 170 or other repository on cloud platform 140. In these instances, cellular only available logic 520 may transfer the data using cellular modem 320 and network 120 if Wi-Fi network 130 is not available at that time.

Notification channel logic 530 may determine instances in which data is to be uploaded via notification modem 330. In instances in which the size or payload of the data is beneath a particular threshold size, for example 256 bytes, notification channel logic 530 may determine that the data uploading is to be done through the notification modem 330. In this instance neither Wi-Fi networks 130 nor cellular networks 120 are to be used. Notification channel logic 530 may turn off data connections and modems (Wi-Fi modem 340 and cellular modem 320) to save power in multiple modem device 110 and save network bandwidth and connections.

Figure 6:
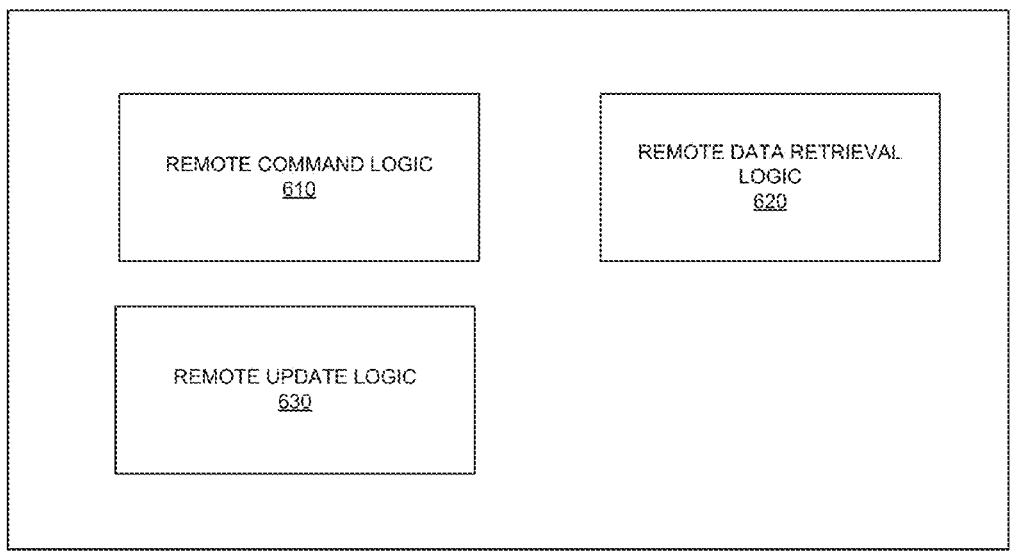
FIG. 6 depicts a functional block diagram of the remote control module of FIG. 4.

FIG. 6 is an exemplary functional block diagram of remote control module 420. As shown in FIG. 6, remote control module 420 may include remote command logic 610, remote data retrieval logic 620, and remote update logic 630. Other configurations may be implemented. Therefore, remote control module 420 may include additional, fewer and/or different components than those depicted in FIG. 6.

Remote command logic 610 may maintain the notification modem 330 in constant standby mode. Remote command logic 610 may allow a user to remotely control multiple modem device 110 from the mobile application associated with user device 190. A remote control command may be from the mobile application on user device 190 to multiple modem device 110 through notification modem 330. Remote command logic 610 may maintain notification modem 330 ready to receive paging command from the back end services server 140.

According to an implementation, remote command logic 610 may allow a user to send instructions to the multiple modem device 110 to perform particular actions immediately, such as unlocking a door. In these instances, only the notification channel is used because the payload to issue a command is small (e.g., below a predetermined threshold for the notification modem 330).

Remote data retrieval logic 620 may determine particular modems to retrieve data remotely in instances in which the data is to be received immediately. For example, mobile application on user device 190 may send a request for the immediate transfer of location information associated with multiple modem device 110. In this instance, if data size of the requested data is beneath a predetermined threshold size (e.g., of the order size of global positioning system (GPS) or other location information), remote data retrieval logic 620 may issue instructions that the data is to be transferred using the notification channel (i.e., notification modem 330). In other instances, remote data retrieval logic 620 may activate or wake up the other components based on available networks and transfer data using Wi-Fi network 130 or cellular network 120.

Remote update logic 630 may download new rules (or updates to the rules) from back end services server 170 to multiple modem device(s) 110. Remote update logic 630 may download an additional rule to respond to a detection of temperature exceeding a particular temperature. For example, in an instance in which the multiple modem device 110 is (or is part of) an air-conditioning device, remote update logic 630 may determine that at a particular temperature, multiple modem device 110 is to turn on an associated air-condition or cooling system. In this instance, remote update logic 630 may use the Wi-Fi network 130 or cellular network to download the rules 120 based on availability of the networks 120/130.

Figure 7:
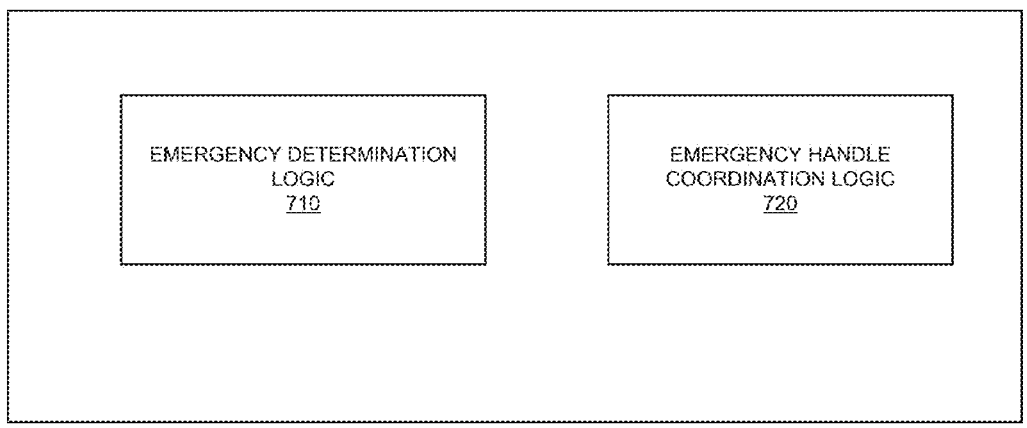
FIG. 7 depicts a functional block diagram of the exceptions handling module of FIG. 4.

FIG. 7 is an exemplary functional block diagram of exceptions handling module 430. As shown in FIG. 7, exceptions handling module 430 may include emergency determination logic 710 and emergency handle coordination logic 720. Other configurations may be implemented. Therefore, exceptions handling module 430 may include additional, fewer and/or different components than those depicted in FIG. 7.

Emergency determination logic 710 may determine whether the current situation is an emergency use case. For example, emergency determination logic 710 may compare the data transfer requirement (including size, time, networks, etc.) with downloaded rules to determine whether the particular instance is an exception case.

Emergency handle coordination logic 720 may handle emergency conditions based on emergency handling rules that are included with rule engine 310. In the case of an emergency or exception from the rules included on multiple modem device 110, emergency handle coordination logic 720 may determine that the rules in the rule engine 310 may are able to handle the exception or emergency case. Emergency handle coordination logic 720 may reach out to the back end services server 170 through the notification modem channel and identify an exception of state of emergency that has occurred at multiple modem device 110.

Back end services server 170 may collect global information through the network 100 regarding additional multiple modem devices 110. Back end services server 170 may determine procedures to be implemented in instances that local rules cannot handle. Emergency handle coordination logic 720 may communicate the emergency situation or parameters associated with the exception to back end services server 170. Back end services server 110 may conduct analysis and issue commands back to multiple modem device 110 through the notification channel. Back end services server 110 may also notify the user via the mobile application (executing on user device 190) to manually issue a command to resolve the emergency or exception. Additional information may then be downloaded from multiple modem device 110 to back end services server 170 though either Wi-Fi (e.g., network 130) or cellular (e.g., network 120) channels. Subsequently, new rules may be updated from back end services server 170 to multiple modem device 110 using Wi-Fi or cellular channels.

According to an implementation, emergency handle coordination logic 720 may use a central command to instruct multiple modem device 110 to perform particular actions to resolve the emergency case. For example, emergency handle coordination logic 720 may provide an instruction for multiple modem device 110 to move a particular distance in a particular direction or to shorten or aggregate information in the message to be transferred. Emergency handle coordination logic 720 may also instruct multiple modem device 110 to ignore or to dump particular types of information.

According to an implementation, emergency handle coordination logic 720 may identify a data transfer scenario is associated with at least one additional multiple modem device 110. In this instance, emergency handle coordination logic 720 may require coordination with the additional multiple modem device 110 and/or back end services server 170 to determine instructions for data transfer. Emergency handle coordination logic 720 may request emergency instructions based on coordination between the multiple modem device 110 and the additional multiple modem device 110.

Figure 8:
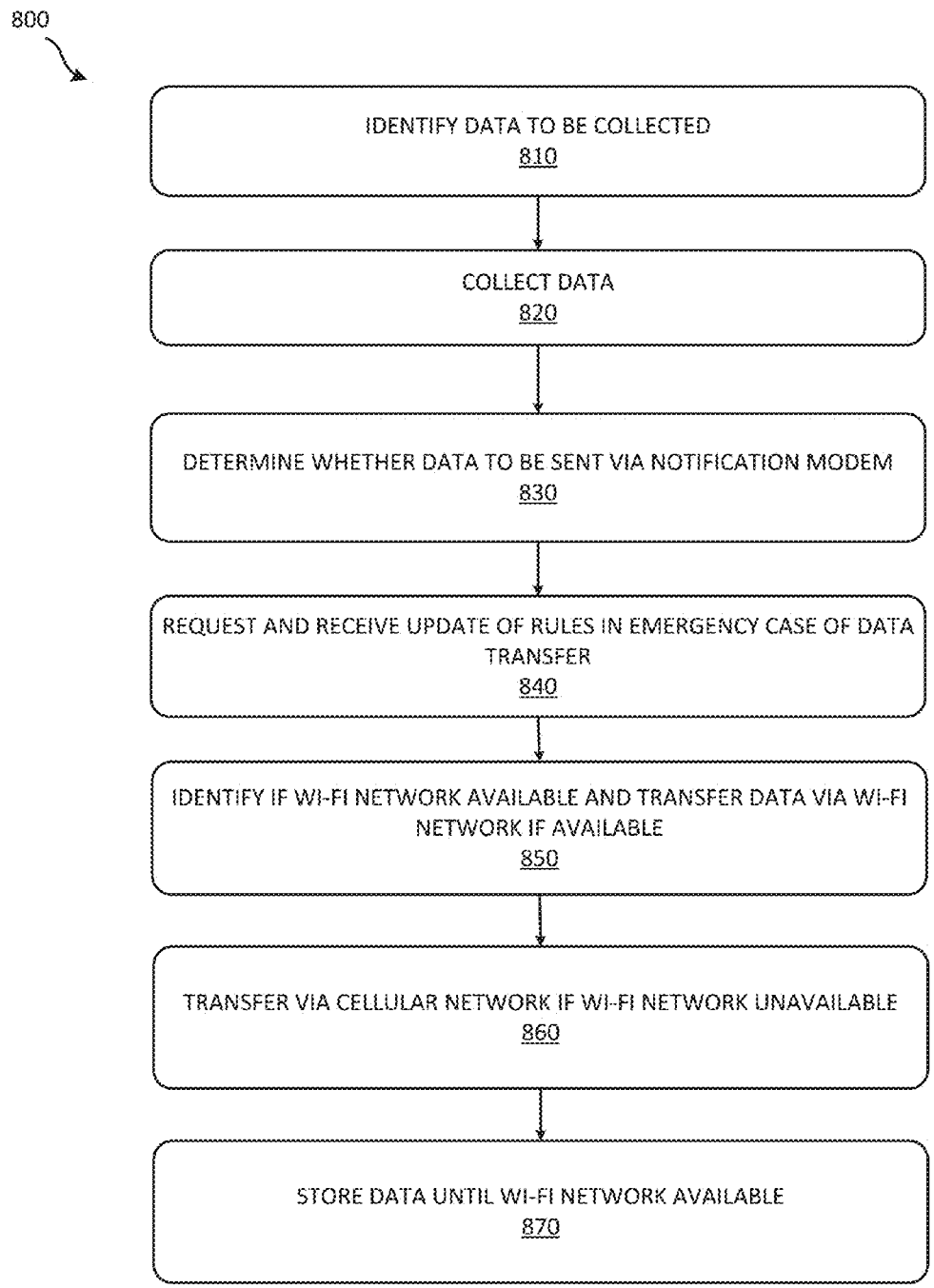
FIG. 8 is a flowchart of an exemplary process for selecting an optimal modem for data transmission from a multiple modem device that includes a notification modem.

FIG. 8 is a flowchart of an exemplary process 800 for selecting an optimal modem for data transmission from a multiple modem device that includes a notification modem. Process 800 may execute in multiple modem device 110. It should be apparent that the process discussed below with respect to FIG. 8 represents a generalized illustration and that other blocks may be added or existing blocks may be removed, modified or rearranged without departing from the scope of process 800.

At block 810, multiple modem device 110 may identify data to be collected. For example, multiple modem device 110 may collect data based on routine data collection procedures associated with multiple modem device 110. Alternatively, multiple modem device 110 may identify data to be collected based on instructions provided by a user via a mobile application and cloud platform 140.

According to an example, the user may access a list of available IoT devices (multiple modem devices 110) via the mobile application on user device 190. The mobile application may authenticate when connecting to the cloud layer or platform 140. The user may input a selection of one of the listed multiple modem devices 110 and choose a command to retrieve particular information, such as retrieve a picture, a location, video, current temperature, consumption statistics, etc.

Multiple modem device 110 may collect the data (block 820). For example, rule engine 310 may activate (or power on) an associated camera to take a requested picture. The associated camera may take the picture and transfer the picture to multiple modem device 110 to be sent to the requesting user device 190.

At block 830, multiple modem device 110 may determine that the data is to be sent via the notification modem based on a payload size associated with the data based on rules selecting an optimal modem for data transmission from multiple modem device 110. Multiple modem device 110 may determine whether a rule associated with the transfer of the particular data requires transfer via the notification modem 330. For example, multiple modem device 110 may determine a rule applicable to transfer of the data based on a size, a type, a time at which the data is collected, etc. In instances in which the data is to be transferred via notification modem 330, multiple modem device 110 may send the data to cloud platform 140 (or via cloud platform to user device 190).

At block 840, multiple modem device 110 may request an update in emergency cases in which the rules do apply to the data. Back end services server 170 may transfer instructions via cloud platform 140 through the notification modem 330 to rule engine 310.

At block 850, multiple modem device 110 may identify whether the Wi-Fi network 130 is available in instances in which the data requires transfer via the Wi-Fi network 130 or cellular network 120. The Wi-Fi modem 340 may be maintained in a powered off state when not transmitting data. If the Wi-Fi network 130 is available, multiple modem device 110 may transfer the data via the Wi-Fi modem 340.

Multiple modem device 110 may determine applicable rules in instances in which the Wi-Fi network 130 is not available (block 860). In some instances, the rules may require that multiple modem device 110 may send the data through a wireless hot spot or cellular network 120 through the cloud platform 170 and then back to the requesting user device 190 (e.g., a cell phone). In other instances, at block 870, multiple modem device 110 may store the data until a Wi-Fi network is available 130 or until a time or other threshold has been exceeded for the collection of the data.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Although the implementations described above mainly refer to a telecommunications service provider providing applications to a customer, in other implementations, other types of customer-provider relationships may be supported.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A computer-implemented method in a multiple modem device, wherein the multiple modem device includes a notification modem and a Wi-Fi modem, comprising:
    identifying data to be collected and rules for selecting an optimal modem for data transmission from the multiple modem device;
    collecting the data;
    determining whether the data is to be sent via the notification modem based on a payload size associated with the data and the rules;
    sending the data via a control channel of a cellular network associated with the notification modem in response to a determination that the data is to be sent via the notification modem;
    determining whether a Wi-Fi network is available in response to a determination that the data is not to be sent via the notification modem; and
    sending the data via the Wi-Fi modem over the Wi-Fi network in response to a determination that the Wi-Fi network is available.

2. The computer-implemented method of claim 1, further comprising:
    storing the data in an associated data repository until the Wi-Fi network is available in response to a determination that the Wi-Fi network is not available.

3. The computer-implemented method of claim 1, wherein the multiple modem device further includes a cellular modem, further comprising:
    determining whether the data is to be sent via the cellular network based on the rules in response to a determination that the Wi-Fi network is not available; and
    sending the data via the cellular network using the cellular modem in response to a determination that the data is to be sent via the cellular network.

4. The computer-implemented method of claim 3, wherein determining whether the data is to be sent via the cellular network further comprises:
    receiving an instruction to send the data via the cellular network from a mobile application on a user device associated with the multiple modem device.

5. The computer-implemented method of claim 1, further comprising:
    updating the rules via downloading from a cloud platform associated with the multiple modem device.

6. The computer-implemented method of claim 1, wherein the Wi-Fi modem is maintained in a powered off state when not transmitting data, further comprising:
    receiving, via the notification modem, a request to transfer selected data via a mobile application on a user device associated with the multiple modem device;
    determining whether a payload size of the selected data is greater than a threshold size;
    powering on the Wi-Fi modem in response to a determination that the payload size of the selected data is greater than the threshold size; and
    sending the selected data via the Wi-Fi modem.

7. The computer-implemented method of claim 1, further comprising;
    selecting between the notification modem and the Wi-Fi modem based on security requirements associated with the data.

8. The computer-implemented method of claim 1, further comprising:
    receiving, via the notification modem, a command to perform a particular action using the multiple modem device via a mobile application on a user device associated with the multiple modem device.

9. The computer-implemented method of claim 1, wherein the multiple modem device comprises at least one of a location tracker, a temperature monitor, or a meter reader.

10. The computer-implemented method of claim 1, further comprising:
    identifying a data transfer scenario to which the rules do not apply;
    requesting emergency instructions from a cloud platform; and
    handling the data based on the emergency instructions.

11. The computer-implemented method of claim 10, wherein identifying the data transfer scenario to which the rules do not apply further comprises:
    identifying that the data transfer scenario is associated with at least one additional multiple modem device; and
    requesting emergency instructions based on coordination between the multiple modem device and the at least one additional multiple modem device.

12. A multiple modem device, comprising:
    a notification modem;

a Wi-Fi modem;
a memory to store a plurality of instructions; and
a processor configured to execute instructions in the memory to:
identify data to be collected and rules for selecting an optimal modem for data transmission from the multiple modem device;
collect the data;
determine whether the data is to be sent via the notification modem based on a payload size associated with the data and the rules;
send the data via a control channel of a cellular network associated with the notification modem in response to a determination that the data is to be sent via the notification modem;
determine whether a Wi-Fi network is available in response to a determination that the data is not to be sent via the notification modem; and
send the data via the Wi-Fi modem over the Wi-Fi network in response to a determination that the Wi-Fi network is available.

13. The multiple modem device of claim 12, further comprising an associated data repository, wherein the processor is further configured to:
store the data in the associated data repository until the Wi-Fi network is available in response to a determination that the Wi-Fi network is not available.

14. The multiple modem device of claim 12, further comprising a cellular modem, wherein the processor is further configured to:
determine whether the data is to be sent via the cellular network based on the rules in response to a determination that the Wi-Fi network is not available; and
send the data via the cellular network using the cellular modem in response to a determination that the data is to be sent via the cellular network.

15. The multiple modem device of claim 12, wherein, when determining whether the data is to be sent via the cellular network, the processor is further configured to:
receive an instruction to send the data via the cellular network from a mobile application on a user device associated with the multiple modem device.

16. The multiple modem device of claim 12, wherein the processor is further configured to:
update the rules via downloading from a cloud platform associated with the multiple modem device.

17. The multiple modem device of claim 12, wherein the Wi-Fi modem is maintained in a powered off state when not transmitting data and wherein the processor is further configured to:
receive a request to transfer selected data via a mobile application on a user device associated with the multiple modem device;
determine whether a payload size of the selected data is greater than a threshold size;
power on the Wi-Fi modem in response to a determination that the payload size of the selected data is greater than the threshold size; and
send the selected data via the Wi-Fi modem.

18. The multiple modem device of claim 12, wherein the multiple modem device comprises an air-conditioning device including an air-conditioning system and wherein the processor is further configured to:
download an additional rule to respond to detection of a temperature equaling or exceeding a particular temperature; and
turn on the air-conditioning system when the temperature equals or exceeds the particular temperature.

19. A non-transitory computer-readable medium including instructions to be executed by a processor in a multiple modem device, wherein the multiple modem device includes a notification modem and a Wi-Fi modem, the instructions including one or more instructions, when executed by the processor, for causing the processor to:
identify data to be collected and rules for selecting an optimal modem for data transmission from the multiple modem device;
collect the data;
determine whether the data is to be sent via the notification modem based on a payload size associated with the data and the rules;
send the data via a control channel of a cellular network associated with the notification modem in response to a determination that the data to be sent via the notification modem;
determine whether a Wi-Fi network is available in response to a determination that the data is not to be sent via the notification modem; and
send the data via the Wi-Fi modem over the Wi-Fi network in response to a determination that the Wi-Fi network is available.

20. The non-transitory computer-readable medium of claim 19, wherein the multiple modem device further includes a cellular modem, and the one or more instructions further includes instructions for causing the processor to:
determine whether the data is to be sent via the cellular network based on the rules in response to a determination that the Wi-Fi network is not available; and
send the data via the cellular network using the cellular modem in response to a determination that the data is to be sent via the cellular network.

* * * * *